United States Patent
Hirose et al.

(10) Patent No.: US 9,464,551 B2
(45) Date of Patent: Oct. 11, 2016

(54) HONEYCOMB CATALYST BODY

(71) Applicant: NGK INSULATORS, LTD., Nagoya (JP)

(72) Inventors: Shogo Hirose, Nagoya (JP); Kazuto Miura, Nagoya (JP); Hirotaka Yamamoto, Nagoya (JP); Fumio Katsube, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 98 days.

(21) Appl. No.: 14/083,515

(22) Filed: Nov. 19, 2013

(65) Prior Publication Data
US 2014/0147342 A1     May 29, 2014

(30) Foreign Application Priority Data
Nov. 27, 2012    (JP) ................... 2012-259111

(51) Int. Cl.
| F01N 3/28 | (2006.01) |
| B01J 35/04 | (2006.01) |
| C04B 38/00 | (2006.01) |
| C04B 111/00 | (2006.01) |
| B01D 46/24 | (2006.01) |

(52) U.S. Cl.
CPC .............. *F01N 3/2828* (2013.01); *B01J 35/04* (2013.01); *C04B 38/0009* (2013.01); *B01D 46/247* (2013.01); *B01D 2046/2433* (2013.01); *C04B 2111/0081* (2013.01); *F01N 2330/48* (2013.01)

(58) Field of Classification Search
None
See application file for complete search history.

(56) References Cited

U.S. PATENT DOCUMENTS

| 2004/0152593 A1* | 8/2004 | Cutler ................ B01J 21/14 502/439 |
| 2004/0187561 A1* | 9/2004 | Ichikawa .................. 73/38 |
| 2007/0224092 A1* | 9/2007 | Miyairi et al. ............ 422/180 |
| 2008/0167178 A1* | 7/2008 | Malyala ............ B01D 53/9418 502/63 |
| 2009/0176053 A1 | 7/2009 | Miyairi et al. |
| 2012/0064286 A1 | 3/2012 | Hirose et al. |
| 2012/0065443 A1* | 3/2012 | Mabande et al. .......... 585/430 |
| 2013/0059724 A1* | 3/2013 | Hirose et al. ............. 502/80 |
| 2013/0236687 A1 | 9/2013 | Hirose et al. |
| 2013/0243999 A1* | 9/2013 | Hirose et al. ............ 428/117 |

FOREIGN PATENT DOCUMENTS

| EP | 2 425 888 A1 | 3/2012 |
| EP | 2 505 252 A1 | 10/2012 |
| EP | 2 636 449 A2 | 9/2013 |
| JP | 2005-246314 | 9/2005 |
| JP | 2009-154148 | 7/2009 |
| JP | 2009-255034 | 11/2009 |

OTHER PUBLICATIONS

Extended European Search Report (Application No. 13194026.4) dated Jun. 2, 2016.

* cited by examiner

*Primary Examiner* — Colin W Slifka
(74) *Attorney, Agent, or Firm* — Burr & Brown, PLLC

(57) ABSTRACT

There is disclosed a honeycomb catalyst body including porous partition walls in which a plurality of cells that become through channels of a fluid are defined and formed, and a plurality of pores are formed, wherein a cell density is from 93 to 186 cells/cm$^2$, and onto the partition walls, a catalyst containing the zeolite is loaded in an amount of 100 to 300 g/L, a porosity (A) of the partition walls before the catalyst is loaded thereonto is 50% or more, and a porosity (B) of the partition walls in a state where the catalyst is loaded thereonto is from 0.3 to 0.6 times as much as the porosity (A).

7 Claims, 2 Drawing Sheets

HONEYCOMB CATALYST BODY

The present application is an application based on JP-2012-259111 filed on Nov. 27, 2012 with the Japanese Patent Office, the entire contents of which are incorporated herein by reference.

BACKGROUND OF THE INVENTION

1. Field of the Invention

The present invention relates to a honeycomb catalyst body for purification of an exhaust gas.

2. Description of Related Art

In an exhaust gas discharged from an internal combustion engine such as a car engine, harmful substances such as carbon monoxide (CO), hydrocarbons (HC) and nitrogen oxides ($NO_x$) are included. When these harmful substances are decreased to purify the exhaust gas, a catalytic reaction has broadly been used. In this catalytic reaction, a harmful substance such as carbon monoxide (CO) can be converted to a harmless substance by a simple method of bringing the exhaust gas into contact with a catalyst. Therefore, in the car or the like, it has been usual that the catalyst is disposed in the middle of an exhaust system of the exhaust gas, to perform the purification of the exhaust gas.

For the purification of the exhaust gas by use of the catalyst, a honeycomb catalyst body has broadly been employed in which the catalyst is loaded onto a honeycomb structure. In the honeycomb catalyst body, the honeycomb structure is formed by partition walls onto which the catalyst is loaded. When the catalyst is loaded onto the partition walls of the honeycomb structure in this manner, a surface area of the catalyst per volume of the catalyst body is large. Therefore, the exhaust gas comes in contact with the catalyst at high frequency. Consequently, in the honeycomb catalyst body, the catalytic reaction is promoted to enable efficient purification of the exhaust gas.

As the above-mentioned catalyst to be loaded onto the honeycomb catalyst body, a zeolite is used sometimes. A metal-substituted zeolite (e.g., a copper ion-exchanged zeolite or an iron ion-exchanged zeolite) is used as an SCR catalyst for $NO_x$ selective reduction in the honeycomb catalyst body for the purification of the exhaust gas (e.g., Patent Document 1). Moreover, the zeolite has a function of adsorbing the HC and the like. When the zeolite is used together with a noble metal catalyst of Pt or the like in the honeycomb catalyst body, the zeolite can adsorb the HC and the like at a low temperature at which the noble metal catalyst is not activated, and can retain the HC and the like as they are until reaching a high temperature (at which the noble metal catalyst is activated). Therefore, it is possible to further increase a purification efficiency of the HC and the like (e.g., Patent Documents 2 and 3).

The catalyst function of the zeolite tends to enhance depending on an amount of the zeolite. Therefore, to intend the enhancement of the purification efficiency of $NO_x$, there has been suggested a modification technology of increasing a cell density of the honeycomb catalyst body while increasing or maintaining the amount of the zeolite to be loaded onto the honeycomb catalyst body [the amount (g/L) of the zeolite per volume of the honeycomb catalyst body]. According to this modification technology, the exhaust gas can come in contact with a large amount of the zeolite at high frequency, and the catalyst function of the zeolite which is dependent on the amount of the zeolite can further effectively be developed.

[Patent Document 1] JP-A-2009-154148
[Patent Document 2] JP-A-2009-255034
[Patent Document 3] JP-A-2005-246314

SUMMARY OF THE INVENTION

In the above-mentioned modification technology, however, a zeolite is a bulky substance, and hence when an amount of the zeolite to be loaded is increased and a cell density is increased, a pressure loss at treatment of an exhaust gas might increase. As a result, there is the fear that the cells are clogged with the zeolite loaded onto partition walls sometimes.

In view of the above problem, an object of the present invention is to provide a technology of suppressing clogging of cells due to a zeolite and a pressure loss, while sufficiently developing a catalyst function of the zeolite which is dependent on an amount of the zeolite.

The present invention is directed to a honeycomb catalyst body which will be described in the following.

According to a first aspect of the present invention, a honeycomb catalyst body including porous partition walls in which a plurality of cells that become through channels of a fluid are defined and formed is provided, and a plurality of pores are formed, wherein a cell density is from 93 to 186 cells/cm$^2$, and onto the partition walls, a catalyst containing a zeolite is loaded in an amount of 100 to 300 g/L, a porosity (A) of the partition walls before the catalyst is loaded thereonto is 50% or more, and a porosity (B) of the partition walls in a state where the catalyst is loaded thereonto is from 0.3 to 0.6 times as much as the porosity (A).

According to the honeycomb catalyst body of the present invention, there are satisfied the requirements that a cell density is from 93 to 186 cells/cm$^2$ (from 600 to 1200 cpsi), an amount of a catalyst to be loaded is from 100 to 300 g/L, a porosity (A) of partition walls before the catalyst is loaded thereonto is 50% or more, and a porosity (B) of the partition walls in a state where the catalyst is loaded thereonto is from 0.3 to 0.6 times as much as the porosity (A). In consequence, clogging of cells with a zeolite and a pressure loss can be suppressed, while sufficiently developing a catalyst function of the zeolite which is dependent on an amount of the zeolite.

DETAILED DESCRIPTION OF THE INVENTION

Hereinafter, an embodiment of the present invention will be described with reference to the drawings. The present invention is not limited to the following embodiment, and changes, modifications and improvements can be added to the present invention without departing from the gist of the present invention.

Figure 1:
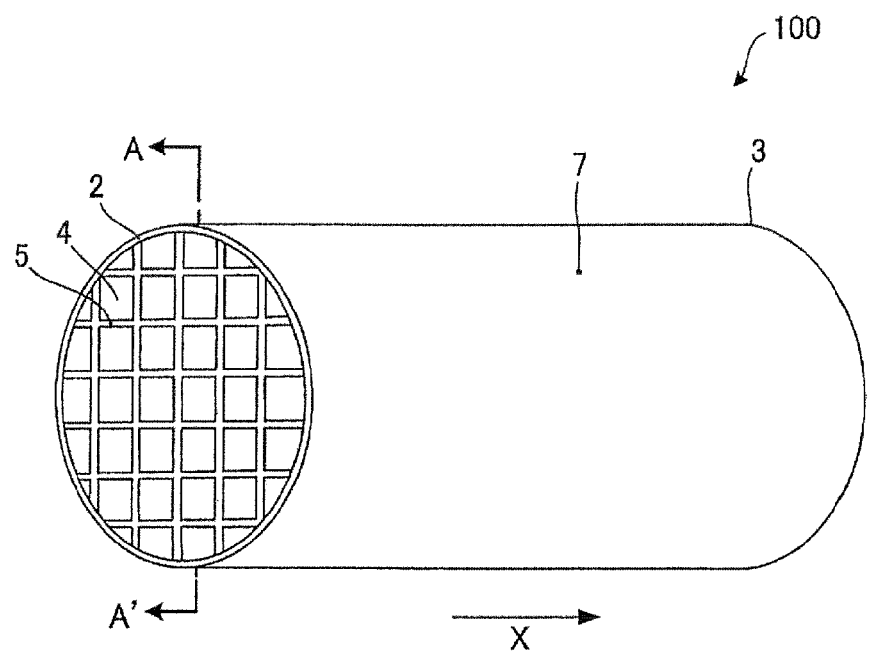
FIG. 1 is a perspective view schematically showing one embodiment of a honeycomb catalyst body of the present invention.

1. Honeycomb Catalyst Body:

FIG. 1 is a perspective view schematically showing one embodiment of the honeycomb catalyst body of the present invention. As shown in the drawing, a honeycomb catalyst body 100 of the present embodiment includes a cylindrical outer peripheral wall 7, and porous partition walls 5 in which a plurality of cells 4 are defined and formed on an inner side of the outer peripheral wall 7. At both ends of the honeycomb catalyst body 100 of the present embodiment in an axial direction X, the plurality of cells 4 are open, and end surfaces 2 and 3 are formed by an edge of the outer peripheral wall 7 and edges of the partition walls 5.

Figure 2:
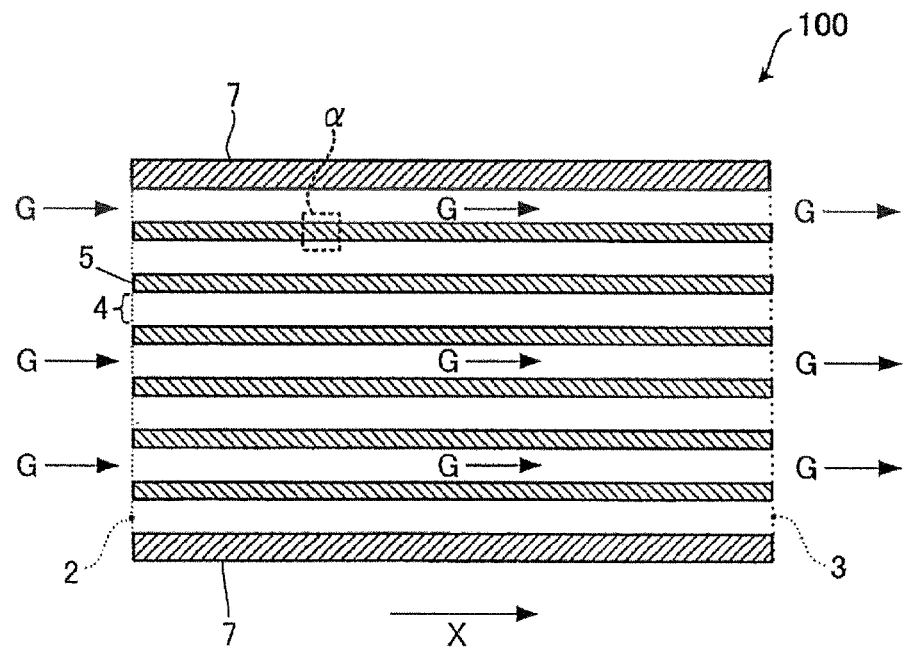
FIG. 2 is a schematic view of a cross section taken along the A-A' line of FIG. 1.

FIG. 2 is a schematic view of a cross section cut along the line A-A' of FIG. 1. As shown in the drawing, in the honeycomb catalyst body 100 of the present embodiment, the plurality of cells 4 extend along the axial direction X, and each of these cells 4 can perform a function of a through channel of a fluid. For example, in the honeycomb catalyst body 100 of the present embodiment, when a gas G is allowed to flow into the cells 4 from the one end surface 2, the gas G can pass through the honeycomb catalyst body to the other end surface 3 along the axial direction X, and can be discharged to the outside.

Figure 3:
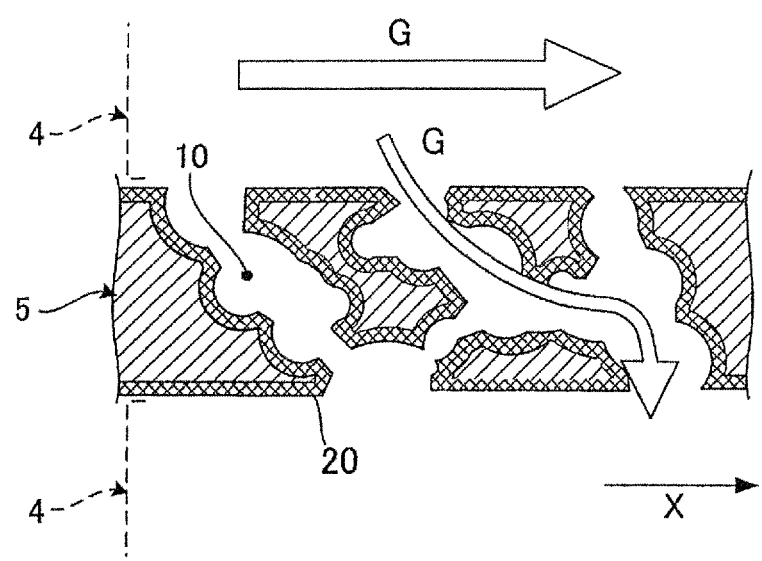
FIG. 3 is a cross sectional view of a partition wall schematically showing the inside of the frame a of FIG. 2.

FIG. 3 is a cross sectional view of the partition wall 5 schematically showing the inside of the frame a of FIG. 2. As shown in the drawing, a plurality of pores 10 are formed in the partition wall 5 of the honeycomb catalyst body 100 of the present embodiment. Furthermore, in the honeycomb catalyst body 100 of the present embodiment, a catalyst 20 containing a zeolite is loaded onto the partition wall 5.

In the honeycomb catalyst body 100 of the present embodiment, a cell density is from 93 to 186 cells/cm$^2$ (from 600 to 1200 cpsi). Moreover, in the honeycomb catalyst body 100 of the present embodiment, an amount of the zeolite-containing catalyst 20 to be loaded onto the partition walls 5 is from 100 to 300 g/L. Furthermore, a porosity (A) of the partition walls before the catalyst 20 is loaded thereonto is 50% or more, and a porosity (B) of the partition walls in a state where the catalyst 20 is loaded thereonto (the state shown in FIG. 3) is from 0.3 to 0.6 times as much as the porosity (A). As in the honeycomb catalyst body 100 of the present embodiment, when there are satisfied the requirements that the cell density is from 93 to 186 cells/cm$^2$ (from 600 to 1200 cpsi), the amount of the catalyst 20 to be loaded is from 100 to 300 g/L, the porosity (A) is 50% or more and the porosity (B) is from 0.3 to 0.6 times as much as the porosity (A), clogging of the cells with the zeolite and a pressure loss can be suppressed, while sufficiently developing a catalyst function of the zeolite which is dependent on an amount of the zeolite.

When the honeycomb catalyst body 100 of the present embodiment satisfies the requirements that the porosity (A) is 50% or more and that the porosity (B) is from 0.3 to 0.6 times as much as the porosity (A), the insides of the pores 10 are not filled with the catalyst 20 in the partition walls 5 in a state where the catalyst 20 is loaded thereonto as shown in FIG. 3. Therefore, in the honeycomb catalyst body 100 of the present embodiment, the surfaces of the partition walls 5 covered with the catalyst 20 are kept in a state where concaves/convexes are present, and the pores 10 extending through the partition walls 5 can still exist sometimes. Consequently, in the honeycomb catalyst body 100 of the present embodiment, a contact area between the gas G flowing in the cells 4 and the catalyst 20 can be kept to be large. As a result, it is possible to enhance a reaction efficiency of a catalytic reaction.

Furthermore, when the honeycomb catalyst body 100 of the present embodiment satisfies the requirements that the porosity (A) is 50% or more and that the porosity (B) is from 0.3 to 0.6 times as much as the porosity (A), a thickness of the catalyst 20 which covers the surfaces of the partition walls 5 is suppressed. Therefore, in the honeycomb catalyst body 100 of the present embodiment, it is possible to sufficiently acquire an open cross sectional area of each of the cells 4 in a cross section of the honeycomb catalyst body which is vertical to the extending direction X of the cells 4 (a cross sectional area of a space through which the gas G can flow). As a result, even when the cell density is from 93 to 186 cells/cm$^2$ (from 600 to 1200 cpsi), the clogging of the cells and the pressure loss can be suppressed.

The porosity of the partition walls which is mentioned in the present description is a value measured by a mercury porosimeter. In the honeycomb catalyst body 100 of the present embodiment, from the viewpoint that the clogging of the cells and the pressure loss are suppressed while increasing the amount of the zeolite to be loaded, the porosity (A) of the partition walls 5 before the catalyst 20 is loaded thereonto is preferably from 40 to 65%. Furthermore, the porosity (A) of the partition walls 5 before the catalyst 20 is loaded thereonto is more preferably from 45 to 55%, and especially, most preferably from 47 to 52%.

Furthermore, in the honeycomb catalyst body 100 of the present embodiment, from the viewpoint that the clogging of the cells and the pressure loss are suppressed, the porosity (B) of the partition walls 5 in the state where the catalyst 20 is loaded thereonto is preferably from 0.4 to 0.6 times as much as the porosity (A). Furthermore, the porosity (3) of the partition walls 5 in the state where the catalyst 20 is loaded thereonto is more preferably from 0.5 to 0.6 times as much as the porosity (A), and especially, most preferably from 0.52 to 0.6 times as much as the porosity (A).

Moreover, in the honeycomb catalyst body 100 of the present embodiment, from the viewpoint that a suitable balance between enhancement of a purification efficiency at treatment of an exhaust gas and the suppression of the pressure loss is kept, the cell density is from 100 to 170 cells/cm$^2$. Furthermore, the cell density is more preferably from 120 to 150 cells/cm$^2$, and especially, most preferably from 130 to 140 cells/cm$^2$.

"The cell density" mentioned in the present description is the number of the cells per unit area in the cross section of the honeycomb catalyst body cut vertically to the cell extending direction.

In the honeycomb catalyst body 100 of the present embodiment, there is not any special restriction on a thickness of the partition walls 5, but the thickness is preferably from 63.5 to 203.2 µm, further preferably from 80 to 160 µm, and especially preferably from 100 to 120 µm. When the partition walls 5 have such a thickness, the honeycomb catalyst body 100 having a high strength and a suppressed pressure loss can be obtained.

"The thickness of the partition walls" mentioned in the present description means a thickness of walls (the partition walls 5) in which two adjacent cells 4 are defined in a state where the catalyst is not loaded onto the walls, in the cross section of the honeycomb catalyst body 100 cut vertically to the extending direction of the cells 4 (the X-direction). For example, "the thickness of the partition walls" can be measured by an image analysis device (trade name "NEXIV, VMR-1515" manufactured by Nikon Corp.).

In the honeycomb catalyst body 100 of the present embodiment, the partition walls 5 preferably contain a ceramic material as a main component. Specifically, a material of the partition walls 5 is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When cordierite is used as the material of the partition walls 5, it is possible to obtain the honeycomb catalyst body having less thermal expansion coefficient and excellent heat shock resistance. Additionally, when the partition walls "contain the ceramic material as the main component" in the present description, it is meant that the ceramic material is contained as much as 50 mass % or more of the whole material.

In the honeycomb catalyst body 100 of the present embodiment, there is not any special restriction on a cell shape, when the cells are seen from the cross section of the honeycomb catalyst body which is perpendicular to the axial direction X. The cell shape may be a round shape shown in FIG. 1. Additionally, any shape, for example, a polygonal shape such as a triangular shape or a hexagonal shape, the round shape or an oval shape may suitably be applied.

In the honeycomb catalyst body 100 of the present embodiment, there is not any special restriction on a thickness of the outer peripheral wall 7, but the thickness is preferably from 0.2 to 4.0 mm. When the thickness of the outer peripheral wall 7 is in the above range, an increase of the pressure loss at flowing of a fluid (e.g., the exhaust gas) in the cells 4 can be prevented, while suitably maintaining the strength of the honeycomb catalyst body 100.

In the honeycomb catalyst body 100 of the present embodiment, a material of the outer peripheral wall 7 is preferably the same as the material of the partition walls 5, but may be different from the material of the partition walls.

In the honeycomb catalyst body 100 of the present embodiment, there is not any special restriction on a shape of the outer peripheral wall 7, and the shape may be a cylindrical shape shown in FIG. 1. Additionally, the shape may be a tubular shape with an oval bottom surface, a tubular shape with a bottom surface having a polygonal shape such as a quadrangular shape, a pentangular shape or a hexagonal shape, or the like.

In the honeycomb catalyst body 100 of the present embodiment, there is not any special restriction on a size of the honeycomb catalyst body 100, but a length of the honeycomb catalyst body in the axial direction X is preferably from 50 to 300 mm. Moreover, for example, when an outer shape of the honeycomb catalyst body 100 is a cylindrical shape, a diameter of the bottom surface is preferably from 110 to 350 mm.

In the honeycomb catalyst body 100 of the present embodiment, as the zeolite contained in the catalyst, a metal-substituted zeolite (e.g., a copper ion-exchanged zeolite, an iron ion-exchanged zeolite or the like) can be used.

Furthermore, in addition to containing the above-mentioned zeolite, the catalyst may contain at least one of a three-way catalyst, an oxidation catalyst, a $NO_x$ selective reduction catalyst, and an $NO_x$ adsorber reduction catalyst.

The three-way catalyst is a catalyst which mainly purifies hydrocarbons (HC), carbon monoxide (CO), and nitrogen oxides ($NO_x$). An example of the three-way catalyst is a catalyst containing platinum (Pt), palladium (Pd), and rhodium (Rh).

An example of the oxidation catalyst is a catalyst containing a noble metal. Specifically, the example of the oxidation catalyst is a catalyst containing at least one selected from the group consisting of platinum, palladium, and rhodium.

An example of the $NO_x$ selective reduction catalyst is a catalyst containing at least one selected from the group consisting of vanadium, titania, tungsten oxide, silver, and alumina.

Examples of the $NO_x$ adsorber reduction catalyst include an alkali metal and/or an alkali earth metal. Examples of the alkali metal include potassium, sodium, and lithium. An example of the alkali earth metal is calcium.

2. Manufacturing Method of Honeycomb Catalyst Body:

For example, the honeycomb catalyst body of the present invention can be obtained by first preparing a honeycomb structure (which is not loaded with the catalyst, and hereinafter the honeycomb structure which is not loaded with the catalyst will be referred to as "the honeycomb structure") as a catalyst loading body, and next loading the catalyst onto the honeycomb structure. One embodiment of the manufacturing method for use in obtaining the honeycomb catalyst body of the present invention will be described.

First, in the manufacturing method of the present embodiment, the honeycomb structure is obtained by successively performing a kneaded material preparing step, a forming step, and a firing step. The kneaded material preparing step is a step of mixing a ceramic raw material and a forming raw material containing a pore former, and kneading the mixture to obtain the kneaded material. The forming step is a step of extrusion-forming the kneaded material obtained by the kneaded material preparing step into a honeycomb shape, to obtain a formed honeycomb body in which a plurality of cells are formed. The firing step is a step of firing the formed honeycomb body to obtain the honeycomb structure.

2-1. Kneaded Material Preparing Step:

In the kneaded material preparing step of the manufacturing method of the present embodiment, the ceramic raw material and the forming raw material containing the pore former are mixed and kneaded to obtain the kneaded material.

Here, as the pore former, starch, resin balloons, a water absorbing resin, silica gel or the like can usually be used.

Moreover, an average particle diameter of the pore former is preferably from 50 to 200 μm, further preferably from 80 to 120 μm, and especially preferably from 100 to 150 μm, from the view point that a pore distribution suitable for manufacturing the honeycomb catalyst body of the present invention is obtained.

It is to be noted that the average particle diameter of the pore former which is mentioned in the present description means an average particle diameter of particles classified by a sieve (represented by a testing sieve mesh opening size measured by a sieving method).

In the manufacturing method of the present embodiment, a content of the pore former in the forming raw material is preferably from 1 to 8 parts by mass with respect to 100 parts by mass of the ceramic raw material.

The ceramic raw material usable in the manufacturing method of the present embodiment is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these examples of the ceramic raw material, the cordierite forming raw material is preferable. When the cordierite forming raw material is used, it is possible to obtain the honeycomb structure having less thermal expansion coefficient and excellent heat shock resistance.

In the manufacturing method of the present embodiment, the forming raw material may contain a dispersion medium, an additive and the like, in addition to the ceramic raw material and the pore former.

An example of the dispersion medium usable in the manufacturing method of the present embodiment is water.

Examples of the additive include an organic binder and a surfactant. A content of the dispersion medium is preferably from 30 to 150 parts by mass with respect to 100 parts by mass of the ceramic raw material.

Examples of the organic binder usable in the manufacturing method of the present embodiment include methylcellulose, hydroxypropoxyl cellulose, hydroxyethyl cellulose, carboxymethyl cellulose, and polyvinyl alcohol. Among these examples, methylcellulose is preferably used together with hydroxypropoxyl cellulose. A content of the organic binder is preferably from 1 to 10 parts by mass with respect to 100 parts by mass of the ceramic raw material.

As the surfactant usable in the manufacturing method of the present embodiment, ethylene glycol, dextrin, fatty acid soap, polyalcohol or the like can be used. One of these surfactants may be used alone, or a combination of two or more of the surfactants may be used. A content of the surfactant is preferably from 0.1 to 5.0 parts by mass with respect to 100 parts by mass of the ceramic raw material.

In the manufacturing method of the present embodiment, there is not any special restriction on a method of kneading the forming raw material to form the kneaded material, and an example of the method is a method using a kneader, a vacuum clay kneader or the like.

2-2. Forming Step:

In the forming step of the manufacturing method of the present embodiment, the kneaded material obtained in the kneaded material preparing step is extrusion-formed into the honeycomb shape to obtain the formed honeycomb body. In this formed honeycomb body, a plurality of cells extending through the formed honeycomb body are formed. The extrusion forming can be performed by using a die. As to the die, a slit shape (a shape of each pin surrounded with the slit), a slit width, a pin density and the like may suitably be designed in accordance with the cell shape, partition wall thickness and cell density of the formed honeycomb body. A material of the die is preferably a refractory metal which does not easily wear away.

2-3. Firing Step:

In the firing step of the manufacturing method of the present embodiment, the formed honeycomb body obtained in the above-mentioned forming step is fired, to obtain the honeycomb structure. The honeycomb structure obtained in this manner includes porous partition walls in which a plurality of cells that become through channels of a fluid are defined and formed, and a plurality of pores are formed.

In the firing step of the manufacturing method of the present embodiment, a firing temperature can suitably be determined in accordance with a material of the formed honeycomb body. For example, when the material of the formed honeycomb body is cordierite, a firing temperature is preferably from 1380 to 1450° C., and further preferably from 1400 to 1440° C. Moreover, a firing time is preferably from about three to ten hours.

In the manufacturing method of the present embodiment, the formed honeycomb body may be dried prior to the firing. There is not any special restriction on a drying method, but examples of the method include hot air drying, microwave drying, dielectric drying, reduced pressure drying, vacuum drying, and freeze drying. Among these examples, the dielectric drying, the microwave drying, or the hot air drying is preferably performed, alone or in combination of these methods. Moreover, drying conditions are preferably a drying temperature of 30 to 150° C. and a drying time of one minute to two hours.

Next, the catalyst is loaded onto the partition walls of the honeycomb structure by the following method.

2-4. Catalyst Loading Step:

First, a catalyst slurry is prepared. An average particle diameter of the catalyst contained in the catalyst slurry is from 0.5 to 5 μm. Furthermore, a viscosity (25° C.) of the catalyst slurry is from 1 to 10 mPa·s. When each of the average particle diameter and the viscosity of the above catalyst is not less than a lower limit value, it is possible to prevent the catalyst from being excessively filled into the pores. Moreover, it is possible to suppress the increase of the pressure loss in the obtained honeycomb catalyst body. When each of the average particle diameter and the viscosity of the catalyst is not more than an upper limit value, it is possible to securely fill the catalyst into the pores. Therefore, the honeycomb catalyst body having a high exhaust gas purification performance is easily obtained.

Next, the catalyst slurry is loaded onto the honeycomb structure. As a method of loading the catalyst slurry onto the honeycomb structure, a heretofore known method such as dipping or suction can be employed. It is be noted that after the dipping, the suction or the like is performed, a surplus catalyst slurry may be blown and flied by compressed air.

Next, the honeycomb structure loaded with the catalyst slurry can be dried and fired, to obtain the honeycomb catalyst body. Drying conditions can be from 120 to 180° C., and from 10 to 30 minutes. Firing conditions can be from 550 to 650° C., and from one to five hours.

EXAMPLES

Hereinafter, the present invention will be described with respect to examples in more detail, but the present invention is not limited to these examples.

Examples 1 to 6 and Comparative Examples 1 to 12

Preparation of Honeycomb Structure

As cordierite forming raw materials, alumina, aluminum hydroxide, kaolin, talc and silica were used. To 100 parts by mass of the cordierite forming raw material, there were added 5 parts by mass of pore former, 85 parts by mass of water (a dispersion medium), 8 parts by mass of water-absorbing hydroxypropyl methylcellulose (an organic binder), and 3 parts by mass of surfactant. Afterward, the materials were mixed, and further kneaded, to obtain a kneaded material.

Next, the kneaded material was extrusion-formed by using a predetermined die, to obtain a formed honeycomb body. As to the formed honeycomb body, quadrangular cells were formed in a cross section of the formed honeycomb body which was perpendicular to a cell extending direction, and the whole shape of the formed honeycomb body was a columnar shape. Then, the obtained formed honeycomb body was dried by a microwave dryer. Afterward, the formed honeycomb body was further completely dried by a hot air dryer. Next, both end surfaces of the dried formed honeycomb body were cut, to form the body in a predetermined dimension.

The formed honeycomb body obtained in this manner was further fired at 1410 to 1440° C. for five hours, to obtain a honeycomb structure.

The obtained honeycomb structure had a diameter of 266.7 mm, and a length of 152.4 mm in a central axis direction (an axial direction X) In the honeycomb structure, a partition wall thickness (μm), a partition wall average pore diameter (μm), an effective geometric surface area (GSA) ($cm^2/cm^3$), a cell density (cells/$cm^2$) and a porosity (A) (%) (a measuring method of the porosity will be described later) are shown in Table 1.

[Preparation of Honeycomb Catalyst Body]

1 kg of water was added to 200 g of a β-zeolite having an average particle diameter of 5 μm, and wet grinding was performed in a ball mill. 20 g of alumina sol was added to the obtained ground particles as a binder, to obtain a catalyst slurry. This catalyst slurry was prepared so as to obtain a viscosity of 5 mPa·s. Then, the honeycomb structure was immersed into this catalyst slurry. Afterward, the honeycomb structure was dried at 120° C. for 20 minutes, and fired at 600° C. for one hour, to obtain a honeycomb catalyst body. A porosity (B) (1) of the honeycomb catalyst body, a value of a ratio of the porosity (B) of the honeycomb catalyst body to the porosity (A) of the honeycomb structure [the porosity (B)/the porosity (A)] and an amount (g/L) of the catalyst to be loaded are shown in Table 1.

[Porosity (%)]:

Porosities (%) of the honeycomb structures and honeycomb catalyst bodies were measured by a mercury porosimeter (mercury porosimetry). The mercury porosimeter of trade name: Auto Pore III type 9405 manufactured by Micromeritics Co. was used.

[Catalyst Clogging]

In each honeycomb catalyst body, a case where any cells clogged with the catalyst were not present was evaluated as "OK" (passed), and a case where even one cell clogged with the catalyst was present was evaluated as "NG" (failed).

[Purification Efficiency ($NO_x$ Purification Efficiency)]

First, a testing gas including $NO_x$ was passed through the honeycomb catalyst body. Afterward, an amount of $NO_x$ in an exhaust gas discharged from this honeycomb catalyst body was analyzed by a gas analysis meter.

A temperature of the testing gas allowed to flow into the honeycomb catalyst body was 200° C. Additionally, temperatures of the honeycomb catalyst body and the testing gas were regulated by a heater. As the heater, an infrared image furnace was used. As the testing gas, there was used a gas in which nitrogen was mixed with 5 vol % of carbon dioxide, 14 vol % of oxygen, 350 ppm of nitrogen monoxide (in terms of volume), 350 ppm of ammonia (in terms of volume)

TABLE 1

| | Honeycomb structure | | | | | Honeycomb catalyst body | | | | | |
|---|---|---|---|---|---|---|---|---|---|---|---|
| | Partition wall thickness (μm) | Ave. pore dia. (μm) | Effective GSA ($cm^2/cm^3$) | Cell density (cells/$cm^2$) | Porosity (A) (%) | Porosity (B) (%) | Porosity (B)/porosity (A) | Amount of catalyst to be loaded (g/L) | Catalyst clogging | $NO_x$ purification ratio (%) | Pressure loss (—) |
| Example 1 | 114.3 | 20 | 0.92 | 93 | 50 | 28.5 | 0.57 | 240 | OK | 92 | OK |
| Example 2 | 88.9 | 20 | 0.84 | 116 | 50 | 29.5 | 0.59 | 240 | OK | 95 | OK |
| Example 3 | 76.2 | 20 | 0.77 | 140 | 50 | 28.0 | 0.56 | 240 | OK | 96 | OK |
| Example 4 | 114.3 | 40 | 0.92 | 93 | 60 | 30.6 | 0.51 | 240 | OK | 93 | OK |
| Example 5 | 114.3 | 20 | 0.92 | 93 | 50 | 28.5 | 0.57 | 100 | OK | 90 | OK |
| Example 6 | 114.3 | 20 | 0.92 | 93 | 50 | 26.5 | 0.53 | 300 | OK | 96 | OK |
| Comparative Example 1 | 114.3 | 4 | 1.16 | 62 | 35 | 32.6 | 0.93 | 120 | OK | 80 | OK |
| Comparative Example 2 | 114.3 | 4 | 1.16 | 62 | 35 | 32.9 | 0.94 | 240 | OK | 88 | NG |
| Comparative Example 3 | 88.9 | 4 | 0.95 | 93 | 35 | 32.2 | 0.92 | 120 | OK | 86 | NG |
| Comparative Example 4 | 88.9 | 4 | 0.95 | 93 | 35 | 32.9 | 0.94 | 240 | NG | — | NG |
| Comparative Example 5 | 63.5 | 4 | 0.78 | 140 | 35 | 32.2 | 0.92 | 120 | OK | 88 | NG |
| Comparative Example 6 | 63.5 | 4 | 0.78 | 140 | 35 | 31.9 | 0.91 | 240 | NG | — | NG |
| Comparative Example 7 | 165.1 | 20 | 1.30 | 47 | 50 | 32.5 | 0.65 | 120 | OK | 78 | OK |
| Comparative Example 8 | 165.1 | 20 | 1.30 | 47 | 50 | 34.0 | 0.68 | 240 | OK | 88 | OK |
| Comparative Example 9 | 139.7 | 20 | 1.13 | 62 | 50 | 32.0 | 0.64 | 120 | OK | 79 | OK |
| Comparative Example 10 | 139.7 | 20 | 1.13 | 62 | 50 | 35.0 | 0.70 | 240 | OK | 69 | OK |
| Comparative Example 11 | 114.3 | 20 | 0.92 | 93 | 50 | 32.5 | 0.65 | 240 | OK | 92 | NG |
| Comparative Example 12 | 76.2 | 20 | 0.77 | 140 | 50 | 35.0 | 0.70 | 240 | OK | 95 | NG |

As to the honeycomb structures and honeycomb catalyst bodies of Examples 1 to 6 and Comparative Examples 1 to 12, evaluations of [Porosity], [Catalyst Clogging], [$NO_x$ Purification Ratio] and [Pressure Loss] were carried out (the results are shown in Table 1). Evaluation methods of the respective evaluations will be described in the following.

and 10 vol % of water. Concerning this testing gas, water and a mixed gas obtained by mixing the other gases were firstly separately prepared, mixed in pipes, and used when a test was carried out. As the gas analysis meter, "MEXA9100EGR manufactured by HORIBA Co." was used. Moreover, a space speed when the testing gas flowed into the honeycomb catalyst body was 50000 (hours$^{-1}$).

"NO$_x$ purification ratio" in Table 1 is a value obtained by dividing, by the amount of NO$_x$ in the testing gas, a value obtained by subtracting, from the amount of NO$_x$ in the testing gas, the amount of NO$_x$ in the gas discharged from the honeycomb catalyst body, and then multiplying the value 100 times. A case where the NO$_x$ purification ratio was 90% or more "passed", and a case where the NO$_x$ purification ratio was smaller than 90% "failed".

[Pressure Loss]

On room temperature (25° C.) conditions, air was allowed to flow through the honeycomb structure and honeycomb catalyst body at a flow rate of 0.5 m$^3$/minute. In this state, a difference between an air inflow side pressure and an air outflow side pressure was measured. This difference in pressure was calculated as a pressure loss (kPa). In an evaluation standard, an object was a pressure loss ratio as a ratio of a value of the pressure loss of the honeycomb catalyst body after the catalyst was loaded thereonto to a value of the pressure loss of the honeycomb structure before the catalyst was loaded thereonto (the value of the pressure loss of the honeycomb catalyst body/the value of the pressure loss of the honeycomb structure). A case where the pressure loss ratio was smaller than 1.15 was evaluated as "OK" (passed), and a case where the pressure loss ratio was 1.15 or more was evaluated as "NG" (failed).

In each of the honeycomb catalyst bodies of Examples 1 to 6, the catalyst clogging did not occur, the NO$_x$ purification ratio was 90% or more, and the pressure loss was evaluated as "OK" (passed).

The present invention can be utilized as a honeycomb catalyst body for purification of an exhaust gas.

DESCRIPTION OF REFERENCE SIGNS

2: (one) end surface, 3: (the other) end surface, 4: cell, 5: partition wall, 7: outer peripheral wall, 10: pore, 20: catalyst, 100: honeycomb catalyst body, and G: gas.

What is claimed is:

1. A honeycomb catalyst body comprising:
porous partition walls in which a plurality of cells that become through channels of a fluid are defined and formed, and a plurality of pores are formed,
wherein the through channels are open at inlet and outlet ends of the body,
wherein a cell density is from 93 to 186 cells/cm$^2$, and onto the partition walls, a catalyst containing a zeolite is loaded in an amount of 100 to 300 g/L, a porosity (A) of the partition walls before the catalyst is loaded thereonto is 50% or more, and a porosity (B) of the partition walls in a state where the catalyst is loaded thereonto is from 0.3 to 0.6 times as much as the porosity (A), and the porosity (B) is 29.5% or less.

2. The honeycomb catalyst body according to claim 1, wherein a cell density is from 116 to 186 cells/cm$^2$.

3. The honeycomb catalyst body according to claim 1, wherein the porosity (B) of the partition walls in a state where the catalyst is loaded thereonto is from 0.4 to 0.6 times as much as the porosity (A).

4. The honeycomb catalyst body according to claim 1, wherein the porosity (B) of the partition walls in a state where the catalyst is loaded thereonto is from 0.5 to 0.6 times as much as the porosity (A).

5. The honeycomb catalyst body according to claim 1, wherein the porosity (B) of the partition walls in a state where the catalyst is loaded thereonto is from 0.52 to 0.6 times as much as the porosity (A).

6. The honeycomb catalyst body according to claim 1, wherein the honeycomb catalyst body exhibits a NO purification ratio of 90% or more.

7. The honeycomb catalyst body according to claim 1, wherein the honeycomb catalyst body exhibits a pressure loss ratio of less than 1.15.

\* \* \* \* \*